(12) United States Patent
Demirci et al.

(10) Patent No.: US 11,660,993 B2
(45) Date of Patent: May 30, 2023

(54) DEVICE FOR INFLUENCING A BACKWARD MOVEMENT OF A SEAT AND SEAT

(71) Applicant: Adient US LLC, Plymouth, MI (US)

(72) Inventors: Oezkan Demirci, Bochum (DE); Dirk Eckenroth, Eitensheim (DE); Rolf Schueler, Heiligenhaus (DE)

(73) Assignee: Adient US LLC, Plymouth, MI (US)

( * ) Notice: Subject to any disclaimer, the term of this patent is extended or adjusted under 35 U.S.C. 154(b) by 0 days.

(21) Appl. No.: 18/054,555

(22) Filed: Nov. 11, 2022

(65) Prior Publication Data
US 2023/0074329 A1    Mar. 9, 2023

Related U.S. Application Data

(62) Division of application No. 16/076,142, filed as application No. PCT/EP2016/071634 on Sep. 14, 2016.

(30) Foreign Application Priority Data

Feb. 8, 2016 (DE) .................... 10 2016 201 843.4

(51) Int. Cl.
*B60N 2/90* (2018.01)
*B60N 2/30* (2006.01)

(52) U.S. Cl.
CPC ............ *B60N 2/938* (2018.02); *B60N 2/3011* (2013.01)

(58) Field of Classification Search
None
See application file for complete search history.

(56) References Cited

U.S. PATENT DOCUMENTS

| | | | |
|---|---|---|---|
| 4,688,662 A | 8/1987 | Correll | |
| 6,336,534 B1 | 1/2002 | Rancourt | |
| 8,833,849 B2 | 9/2014 | Ishimoto | |
| 2002/0145315 A1 | 10/2002 | Fraley et al. | |
| 2006/0076819 A1 | 4/2006 | Burch | |
| 2008/0143157 A1 | 6/2008 | Burch | |
| 2009/0127791 A1 | 5/2009 | Buro et al. | |
| 2015/0123444 A1 | 5/2015 | Assmann | |
| 2016/0023577 A1* | 1/2016 | Yamada | B60N 2/2227 297/367 R |
| 2018/0029422 A1 | 2/2018 | Thompson | |
| 2019/0375239 A1 | 12/2019 | Thompson | |

FOREIGN PATENT DOCUMENTS

| | | |
|---|---|---|
| CN | 101918243 A | 12/2010 |
| DE | 19648974 A1 | 5/1997 |
| DE | 102008047847 A1 | 4/2010 |
| DE | 102013103694 A1 | 10/2014 |

(Continued)

*Primary Examiner* — David E Allred
(74) *Attorney, Agent, or Firm* — Marshall & Melhorn, LLC

(57) ABSTRACT

The invention relates to a device for influencing a backward movement of a seat, in particular a backrest part of the seat, with at least one deformation element arranged in a hinged area of the seating part of the seat, the deformation element being configured such that the deformation element can be deformed due to a force acting on the seating part and/or the back part at a predefined torque curve. The invention also relates to a seat, in particular a vehicle seat, comprising a seating part, a backrest part and the type of device.

13 Claims, 13 Drawing Sheets

(56) References Cited

FOREIGN PATENT DOCUMENTS

| | | |
|---|---|---|
| EP | 2662238 A1 | 11/2013 |
| EP | 2955055 A1 | 12/2015 |
| FR | 2873962 A1 | 2/2006 |
| FR | 2949397 B1 | 8/2013 |
| WO | 2001064470 A1 | 9/2001 |
| WO | 2010109127 A1 | 9/2010 |

* cited by examiner though on the basis of dimensioning by means of a free space, said free space having a simple geometric structure. This permits a simple design of the device by the selection of components and simple properties thereof.

DEVICE FOR INFLUENCING A BACKWARD MOVEMENT OF A SEAT AND SEAT

CROSS REFERENCE TO RELATED APPLICATIONS

This application is a Divisional Application of U.S. application Ser. No. 16/076,142, filed Aug. 7, 2018, which is a United States National Phase Application of International Application PCT/EP2016/071634, filed Sep. 14, 2016, and claims the benefit of priority under 35 U.S.C. § 119 of German Application 10 2016 201 843.4, filed Feb. 8, 2016, the entire contents of which are incorporated herein by reference.

FIELD OF THE INVENTION

The invention relates to a device for influencing a backward movement of a seat.

The invention further relates to a seat, in particular a vehicle seat, comprising such a device.

BACKGROUND OF THE INVENTION

In road traffic accidents, in particular in collisions of motor vehicles, the forces present may lead to a backward downward movement, i.e. a movement in the direction of a vehicle rear and floor, of a vehicle seat, in particular a seat backrest or a backrest part, relative to an installed position of the vehicle seat in a vehicle. As a result, there is the risk that the vehicle seat is at least partially deformed to an undesirably high degree, resulting in uncontrolled movements of the vehicle seat and the consequent risks to persons seated on the vehicle seat and further persons in the vehicle.

Different devices are known from the prior art, said devices positively influencing a backward movement of the vehicle seat, for example by kinematic movements being additionally specifically triggered and performed exclusively in the event of a crash in selected regions. Some known devices are based on different mechanisms which in each case are complex and comprise a plurality of movable components, wherein typically a movement sequence of these components is triggered by mechanical or electronic signals. Other known solutions are based on deformations of connecting parts occurring exclusively in the event of a crash between, for example, the backrest part and the seat substructure, wherein these solutions, however, lead to relatively large backward movement angles of the backrest parts which is disadvantageous in the event of a crash.

SUMMARY OF THE INVENTION

An object of the invention is to provide a device which is improved relative to the prior art for influencing a backward movement of a seat, and an improved seat, in particular a vehicle seat.

According to the invention, with regard to the device the object is achieved by the device according to the invention for influencing a backward movement of a seat, in particular a backrest part, comprises at least one deformation element arranged in a hinged area of the seating part of the seat, also called the seat substructure, wherein the deformation element is configured such that the deformation element is deformable due to a force acting on the seating part and/or the backrest part at a predefined torque curve, the definition thereof being dependent on the crash requirements of the respective vehicle.

The device permits the backward movement of the seat, in particular the backrest part of the seat, to be influenced and controlled in a simple and reliable manner. The seat is, for example, a vehicle seat. Thus it is possible to absorb partially or fully the force acting on the vehicle seat in the event of an accident and/or in the event of a crash by a deformation of the deformation element at a predefined torque curve and thus to produce or control a desired backward movement of the vehicle seat by corresponding dimensioning and design of the deformation element. As a result, in particular during a crash, particularly high forces acting on the respective person are avoided.

In this case, the arrangement of the deformation element in the immediate vicinity of a hinge point of the seat substructure permits a relatively simple construction since the movement as such, namely the pure rotational movement, may be predetermined by the hinge point and thus, in principle, the deformation element is able to be designed in a simple manner as a component arranged parallel to the hinge.

The vehicle seat is further prevented from being deformed to an undesirably high degree, whereby uncontrolled movements of the vehicle seat caused thereby and the resulting risks to the person seated on the vehicle seat and further persons in the vehicle are prevented or at least reduced.

Moreover, the at least one deformation element permits an additional support in the vehicle transverse direction, also denoted the Y-direction, during an accident or in the event of a crash without an additional support element.

By means of the deformation element, therefore, an element which absorbs kinetic energy is produced, said element being able to be integrated in a seat structure as a modular unit in the manner of a standard adjustable component and thus at least partially replacing the use of vehicle-specific structural parts, such as for example fitting lower parts or seat frame side parts, and at least reducing the number of variants thereof.

Moreover, the deformation element has a very small constructional space requirement and is able to be integrated in a simple manner in an existing seat substructure design. Due to the basic structural design with regard to the amount of energy dissipation and a path opened up thereby, the solution is able to be adapted to different requirements in a particularly simple manner merely by varying the component parameters.

In one possible development of the device, the seating part comprises two side parts and pivoting arms, wherein between the pivoting arms a transverse strut connecting said pivoting arms is arranged, wherein at least on one side between a pivoting arm located in the vicinity of one of the side parts and one end of the transverse strut, a deformation element is arranged in the hinged area. This permits a height adjuster of the vehicle seat to be relieved of load in the event of an accident and/or in the event of a crash. Moreover, in a simple manner it is possible that by arranging the at least one deformation element between the side part and the transverse strut, the deformation of the backrest part and the seating part takes place in a symmetrical manner on both sides, i.e. in particular on a side facing a vehicle door and a side remote from the vehicle door.

One possible embodiment of the device provides that the deformation element is formed from at least two parts. In this case, the parts may be formed in a homogenous manner from one material or from a plurality of materials, for example having different properties. A material expansion, hardness and/or strength and a structure of the respective part are adapted according to the defined torque requirement and to the rotational angle. The separate parts are fixed together by means of conventional connections, for example by a material bond, form-fit connection or force-fit connection, for example by means of a welded connection, riveted connection or adhesively bonded connection.

A further possible embodiment of the device provides that one of the parts is harder than the other part. In other words: the deformation element is formed from at least one flexible part and from at least one hard part, wherein the flexible part and the hard part are connected together or configured separately. By dimensioning the two parts and selecting the hardness of the two parts, the deformability of the deformation part and as a result the predefined torque curve is able to be predetermined in a simple manner.

According to one development of the device, one part forms a base part and the other part forms a support part, wherein the support part is connected to the base part such that the support part is deformable or adjustable in a resilient manner relative to the base part. For example, the base part and the support part are connected together via at least one or a plurality of resiliently deformable absorption parts, such as webs, wherein in the case of backward movement of the seat the torque curve is able to be predefined in a simple manner by a corresponding dimensioning and design of the absorption parts.

Alternatively or additionally, the deformation element may comprise recesses, wherein in the case of a backward movement of the seat the torque curve is also able to be predefined in a simple manner by a corresponding dimensioning of the recesses.

One possible embodiment of the device provides that when a predetermined threshold value of the force acting on the seating part and/or the backrest part is exceeded, an operative connection is produced between the at least two parts. For example, during an accident the flexible part comes into an operative connection and contact with the hard part, such that the predefined torque curve is possible by a corresponding design and dimensioning of both parts.

For example, the at least two parts have in each case a profile, for example a toothed profile or rim profile, for producing this operative connection in a contact region in a simple and reliable manner.

A development of the device provides that at least one of the parts is configured as a ring. Thus it may be ensured in a simple and reliable manner that the backward movement of the seat, in particular of the backrest part of the seat, is produced by a rotation and/or deformation about the ring or by the ring about the further part. As a result, it may be achieved that a relative movement of the backrest part to the seating part takes place at a predetermined position, i.e. in the hinged area at the position of the deformation element.

In an alternative embodiment, the deformation element may be formed from one part, the material thereof having a corresponding different expansion behavior and/or corresponding different strengths. Such a deformation element is configured, for example, as a double ring with webs connecting both rings. In this case, during an accident the webs between the two rings deform so that one of the rings rotates by a specific angle relative to the other ring. This produces a predefined torque curve and influences to a desired degree the backward movement of the seat, in particular of the backrest part, depending on the dimensioning of the webs.

The seat according to the invention, in particular the vehicle seat, comprises a seating part, a backrest part and a device according to the invention or embodiments and developments thereof. Due to the deformation of the deformation element at a predefined torque curve during an accident or in the event of a crash, in the case of a force acting on the seating part and/or the backrest part, the device permits the backward movement of the seat, in particular of the backrest part, to be influenced or controlled and thus the occupant safety to be increased.

The invention is hereinafter described by way of example and by way of the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
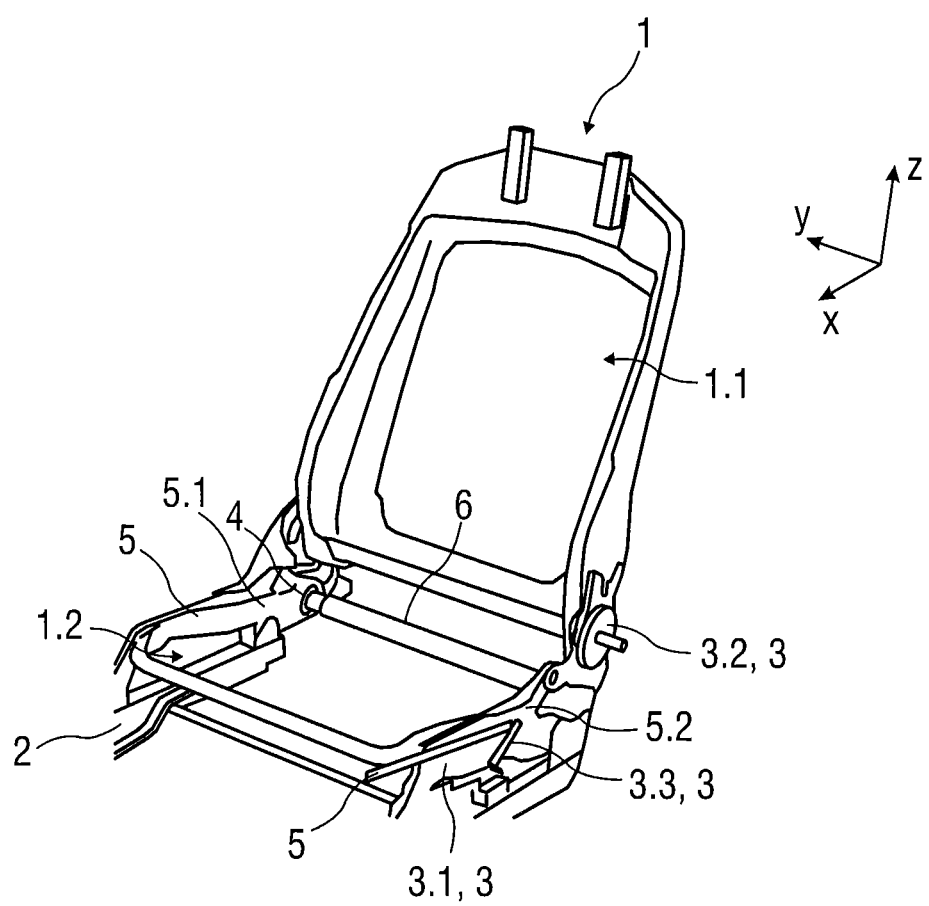
FIG. 1 is a schematic perspective view of a seat, in particular a vehicle seat, comprising a backrest part and a seating part.

Referring to the drawings, parts which correspond to one another are provided in all of the figures with the same reference numerals. FIG. 1 shows schematic perspective view a seat 1, in particular a vehicle seat. The seat 1 comprises a backrest part 1.1 and a seating part 1.2, also denoted as the seat substructure. The backrest part 1.1 and the seating part 1.2 are adjustable relative to one another, in particular rotatable and adjustable relative to one another, in particular adjustable in the vertical direction Z and/or the longitudinal direction X, in particular longitudinally adjustable or tiltable in the vertical direction.

The seat 1 is attached to a seat rail pair 2, which is formed from a seat lower rail which is fixedly connected to a vehicle structure and a seat upper rail which is displaceably arranged on the seat lower rail and which bears the seat 1.

To this end, the seat 1 comprises at least one adjusting unit 3 such as a longitudinal adjuster 3.1, a tilt adjuster 3.2 and/or a height adjuster 3.3.

According to the invention, the seat 1 comprises a device for influencing a backward movement in the event of an accident. To this end, the device comprises a deformation element 4 which is arranged in the region of the lower seating part 1.2 of the seat 1.

The seating part 1.2 comprises two side parts 5, wherein the side parts 5, for example, in each case comprise a so-called pivoting arm 5.1. One of the side parts 5 comprises a height adjuster 5.2. The side parts 5 are connected together by means of at least one transverse strut 6. In this case, the deformation element 4 is arranged at least on one side between one of the side parts 5, in particular the pivoting arm 5.1, and one end of the transverse strut 6, said deformation element in the event of a crash being deformable due to a force acting on the seating part 1.2 and/or the backrest part 1.1 at a predefined torque curve and, as a result, at least permitting the backward movement of the seat 1 to be influenced or controlled.

Figure 2:
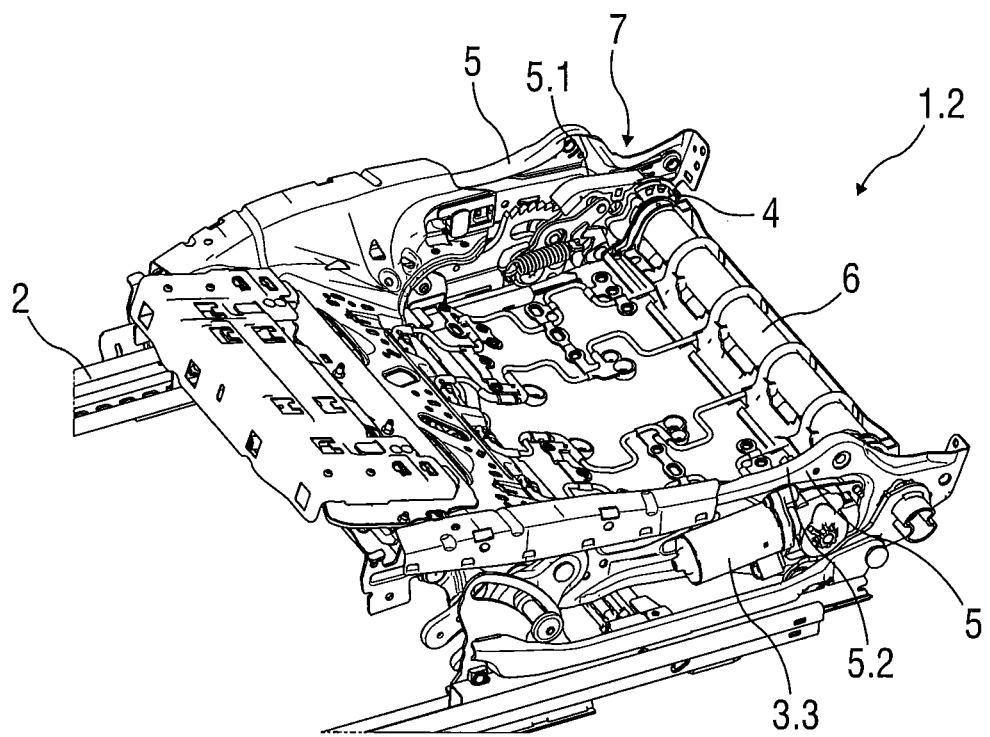
FIG. 2 is a schematic perspective view of a seating part with a device for influencing a backward movement of a seat, in particular a backrest part of the seat.

FIG. 2 shows schematic perspective view the lower seating part 1.2 with a device for reducing a backward movement of the seat 1, in particular the backrest part 1.1. The device in this case is arranged in the hinged area 7 for the height adjuster 3.3.

Figure 3:
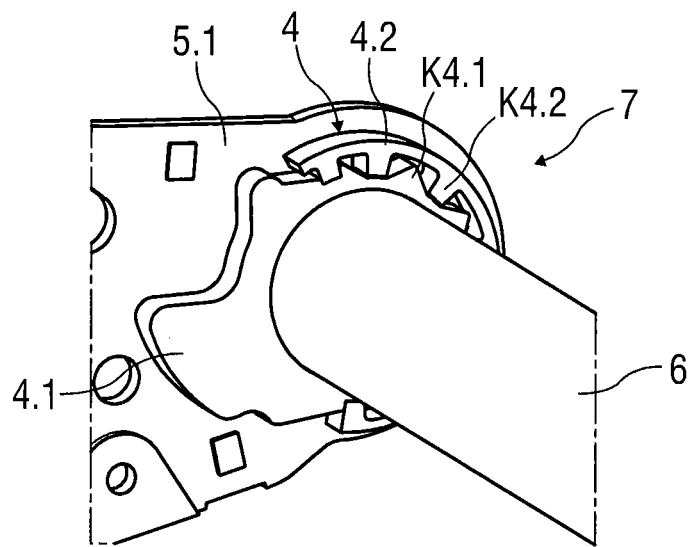
FIG. 3 is a schematic perspective view of an enlarged view of a hinged area of a seating part with a deformation element.

FIG. 3 shows schematic perspective view an enlarged view of the hinged area 7 of the seating part 1.2 with an embodiment of the deformation element 4. In this embodiment, the deformation element 4 is formed from at least two parts 4.1, 4.2. In this case one of the parts 4.1 is formed from a hard material and the other part 4.2 is formed from a more flexible material.

In the exemplary embodiment, the parts 4.1, 4.2 are configured separately. The hard part 4.1 is arranged and fastened at one end of the transverse strut 6. The other part, in particular the flexible part 4.2, is fastened to the corresponding side part 5 of the seating part 1.2.

Alternatively, the deformation element 4 may be formed in one piece as a two-component element, in particular an injection-molded part, made of two different materials. Alternatively, the flexible and hard parts 4.1, 4.2 may be connected together.

The deformation element 4 is configured such that during an accident, the flexible part 4.2 comes into an operative connection and contact with the hard part 4.1 such that a predefined torque curve is possible by a corresponding design and dimensioning of both parts 4.1, 4.2.

To this end, the two parts 4.1, 4.2 comprise rim profiles K4.1, K4.2 on the edge in the contact region. For example the hard part 4.1 has a toothed rim profile K4.1. The flexible part 4.2 has a web-shaped rim profile K4.2, wherein the flexible webs enter into an operative connection with the hard teeth in the event of an accident and are deformed and a backward movement of the seat 1, in particular of the backrest part 1.1, takes place at a predefined torque curve.

By a corresponding design and embodiment of the parts 4.1, 4.2 the backward movement of the backrest part 1.1 is predeterminable, in particular able to be reduced or enlarged or limited. Additionally, the height adjuster 3.3 is able to be relieved of load in the event of an accident. The parts 4.1, 4.2 are able to be produced in a simple manner. Moreover, the parts 4.1, 4.2 may be easily connected together.

Alternatively, in a different embodiment the deformation element 4 may also be arranged at a different appropriate point on the seat 1.

With a corresponding embodiment of the deformation element 4, a broad torque spectrum may be predetermined for the backward movement of the backrest part 1.1. For example, by different diameters, thicknesses, heights, widths and/or material strengths of the parts 4.1, 4.2, or different thicknesses and/or widths of the rim profiles K4.1, K4.2 of the parts 4.1, 4.2, a torque curve may be predefined for the backward movement of the backrest part 1.1. Moreover, the torque curve may be predefined by the oblique shapes of the teeth and webs of the rim profiles K4.1, K4.2.

Figure 4A:
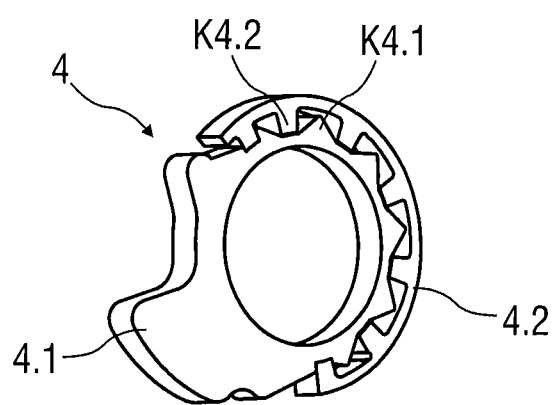
FIG. 4A is a schematic perspective view showing one of different embodiments of a deformation element.
Figure 4B:
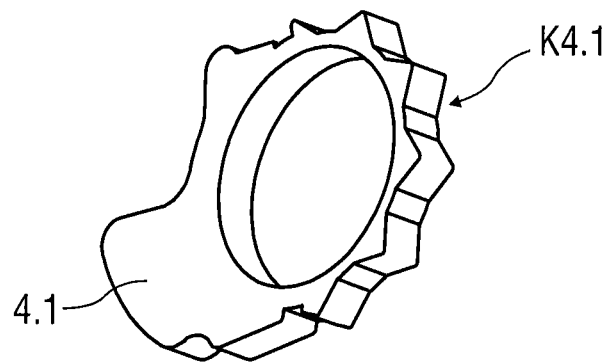
FIG. 4B is a schematic perspective view showing another of different embodiments of a deformation element.
Figure 4C:
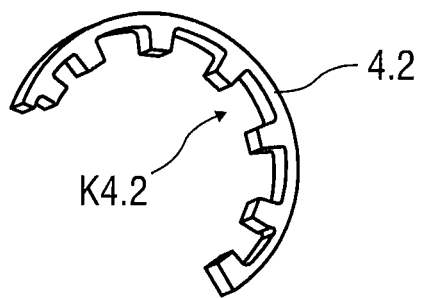
FIG. 4C is a schematic perspective view showing another of different embodiments of a deformation element.

FIGS. 4A to 4C show schematically different embodiments of the two-part deformation element 4. FIG. 4A shows the parts 4.1, 4.2 in the operative state in which the two parts 4.1, 4.2 engage in one another. FIG. 4B shows one possible embodiment of the hard part 4.1 and FIG. 4C shows one possible embodiment of the flexible part 4.2.

Figure 5:
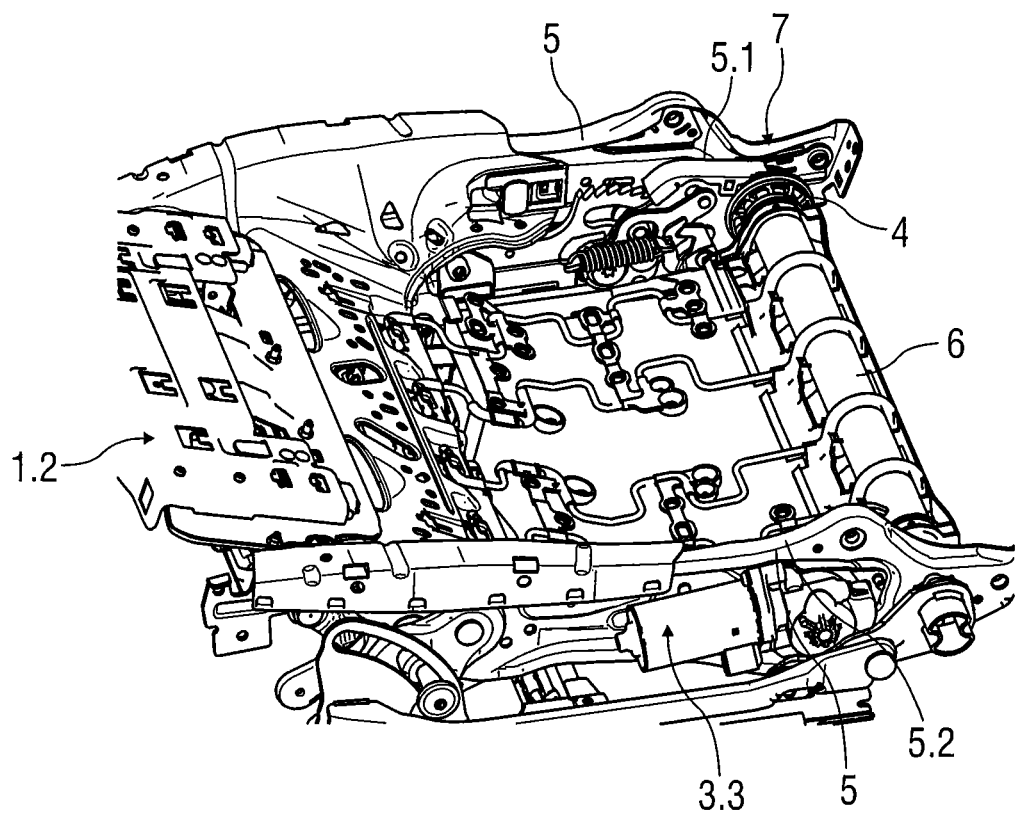
FIG. 5 is a schematic perspective view of a hinged area of a seating part with an alternative embodiment of a deformation element.
Figure 6:
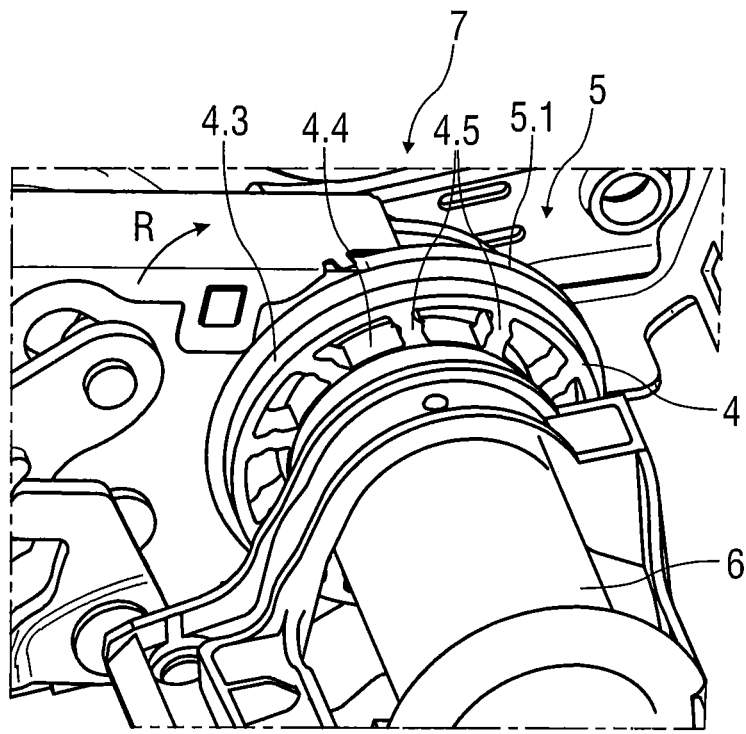
FIG. 6 is a schematic enlarged perspective view of a hinged area of a seating part with an alternative embodiment of a deformation element.

FIGS. 5 and 6 show schematic perspective view an enlarged view of the hinged area 7 of the lower seating part 1.2 with an alternative embodiment of a deformation element 4. The deformation element 4 is configured in one piece. For example, the one-piece deformation element 4 has two partial regions 4.3, 4.4 spaced apart radially from one another, also denoted hereinafter as rings 4.3, 4.4. The rings 4.3, 4.4 are connected together by means of further partial regions 4.5 denoted hereinafter as webs 4.5. The webs 4.5 extend obliquely between the two rings 4.3, 4.4.

The internal ring 4.4 is fastened to the transverse strut 6. The external ring 4.3 is fastened to the side part 5. In the event of an accident, the internal and external rings 4.3, 4.4 remain arranged in a stable and fixed manner on the side part 5 and/or on the transverse strut 6. By a backward movement in the rotational direction R as a result of the accident, the external ring 4.3 rotates and as a result the webs 4.5 are deformed. By a corresponding design of the webs 4.5 and the rings 4.3, 4.4 a defined torque curve is able to be predetermined and set during the backward movement of the backrest part 1.1 in the rotational direction R. A desired rotation and a deformation path may be achieved and set by a corresponding oblique position of the webs 4.5.

Figure 7:
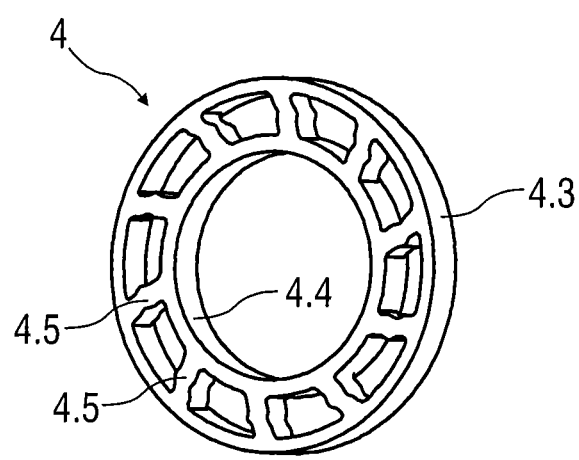
FIG. 7 is a schematic perspective view showing one of different exemplary embodiments of a deformation element.
Figure 8:
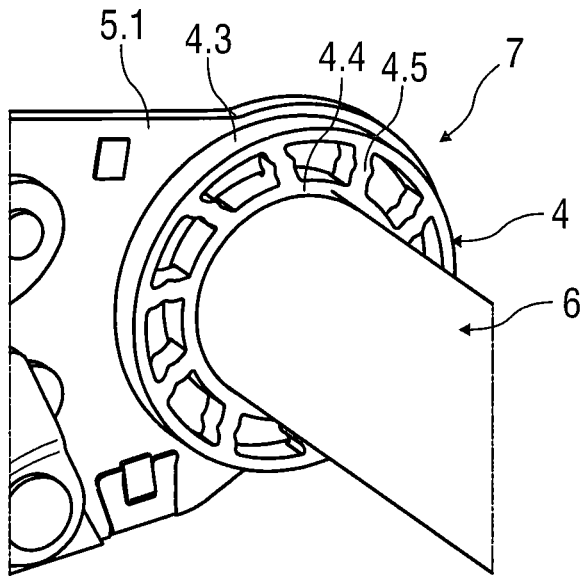
FIG. 8 is a schematic perspective view showing another of different exemplary embodiments of a deformation element.

FIGS. 6 to 8 show the deformation element 4 with the double ring (rings 4.3, 4.4) and the oblique webs 4.5 before a deformation and thus before an accident.

Figure 9:
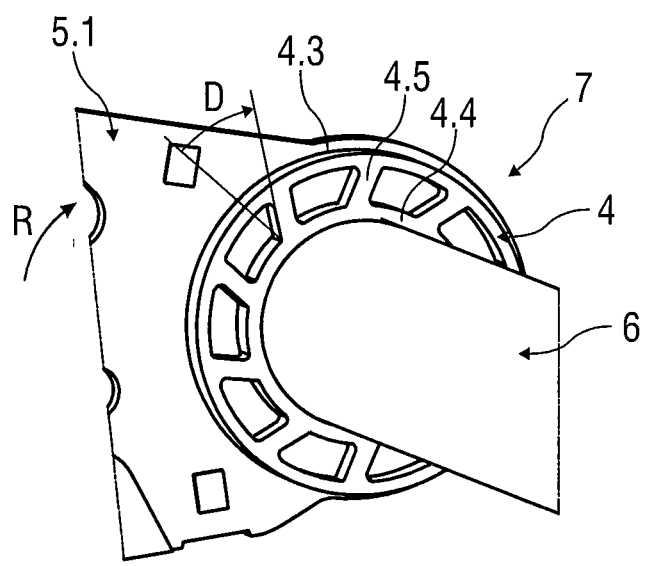
FIG. 9 is a schematic perspective view showing another of different exemplary embodiments of a deformation element.

FIG. 9 shows the deformation element 4 after an accident with the deformed webs 4.5 at a deformation angle D. The webs 4.5 are deformed in the rotational direction R as a result of the backward movement of the backrest at a deformation angle D, such that one of the two rings 4.3, 4.4, in particular the external ring 4.3, has a desired rotation and thus achieves a defined torque curve.

In this case, the two rings 4.3, 4.4 are formed from hard material and the webs 4.5 from a more flexible material. Depending on the specification for the torque curve, the rings 4.3, 4.4 may also be formed from materials of different hardnesses.

Depending on the material, material expansion or material strength, and by other diameters, thicknesses or widths of the rings 4.3, 4.4, and other thicknesses, widths, oblique portions and/or shapes of the webs 4.5, the torque curve for the backward movement may be set and predetermined.

Figure 10A:
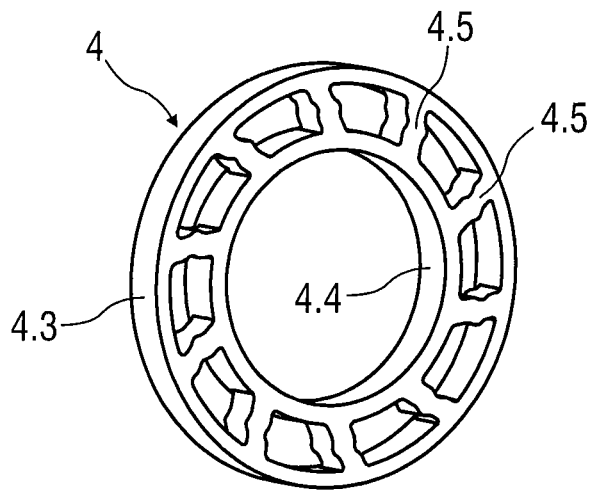
FIG. 10A is a schematic perspective view showing another of different exemplary embodiments of a deformation element.
Figure 10B:
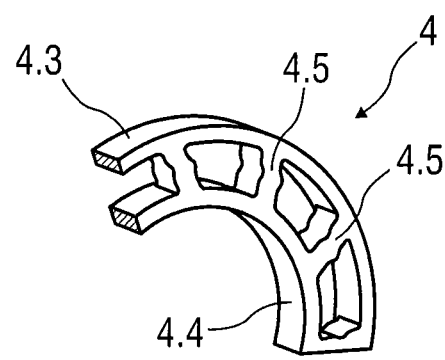
FIG. 10B is a schematic perspective view showing another of different exemplary embodiments of a deformation element.
Figure 10C:
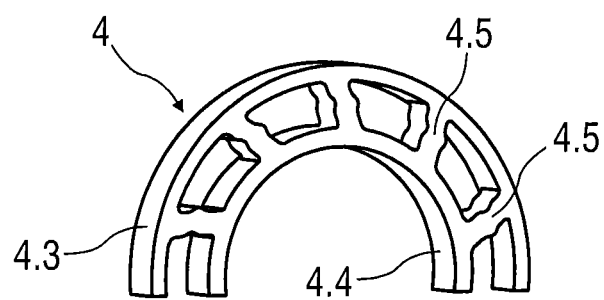
FIG. 10C is a schematic perspective view showing another of different exemplary embodiments of a deformation element.

FIGS. 10A to 10C show different embodiments of the deformation element 4 with a double-ring design in a circular shape (FIG. 10A), as a circular segment (FIG. 10B) or as a semi-circle (FIG. 10C).

FIGS. 11 to 14C show a further exemplary embodiment of a deformation element 4. The deformation element 4 comprises as a support part a wide ring 4.6 with recesses 4.7, which at least in the event of an accident is in engagement and is operatively connected to a stop element 4.8 as a base part.

In this case, an axial external ring surface F1 of the wide ring 4.6 which bears against the side part 5 is fastened thereto. The opposing and axial internal ring surface F2 of the wide ring 4.6 which bears against the transverse strut 6 is connected thereto. The recesses 4.7 are incorporated in the ring 4.6 such that oblique webs 4.9 are formed. In the event of an accident, the axial ring surfaces F1, F2 remain stable and fixed so that the webs 4.9 deform and the external ring surface F1 has a desired rotation in the rotational direction R and thus achieves a defined torque curve.

In the event of an accident, the ring surfaces F1, F2 remain stable and fixed on the side part 5 and/or fastened to the transverse strut 6. The external ring surface F1 rotates in the rotational direction R as a result of the backward displacement of the backrest, whereby the webs 4.9 are deformed by a deformation angle D, so that one of the two ring surfaces F1, F2, in particular the external ring surface F1, has a desired rotation and thus achieves a defined torque curve.

In this case, the two ring surfaces F1, F2 may be formed from hard material and the webs 4.9 from a more flexible material. Depending on the specification of the torque curve, the ring surfaces F1, F2 may also be formed from materials of different hardnesses.

Depending on the material, material expansion or material strength and by other diameters, thicknesses or widths of the ring surfaces F1, F2, other thicknesses, widths, oblique portions and/or shapes of the webs 4.9, the torque curve for the backward movement may be set and predetermined.

Figure 11:
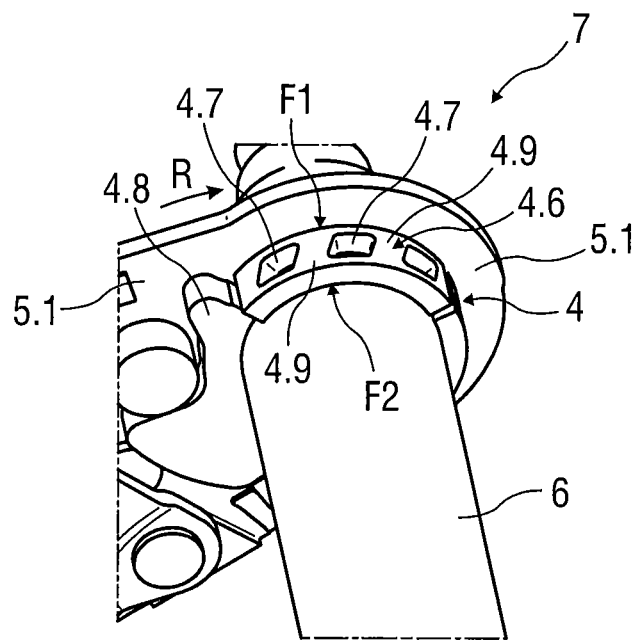
FIG. 11 is a schematic perspective view showing another of different exemplary embodiments of a deformation element.

FIG. 11 shows the deformation element 4 before an accident with the webs 4.9 undeformed.

Figure 12:
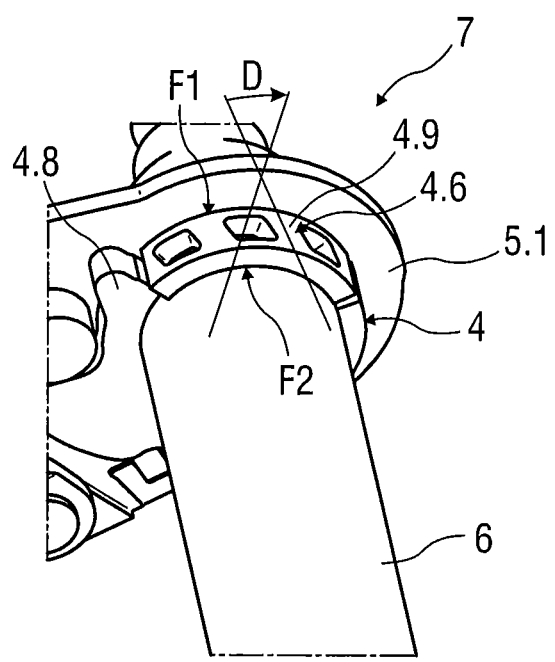
FIG. 12 is a schematic perspective view showing another of different exemplary embodiments of a deformation element.

FIG. 12 shows the deformation element 4 after an accident with the webs 4.9 deformed by the deformation angle D.

Figure 13:
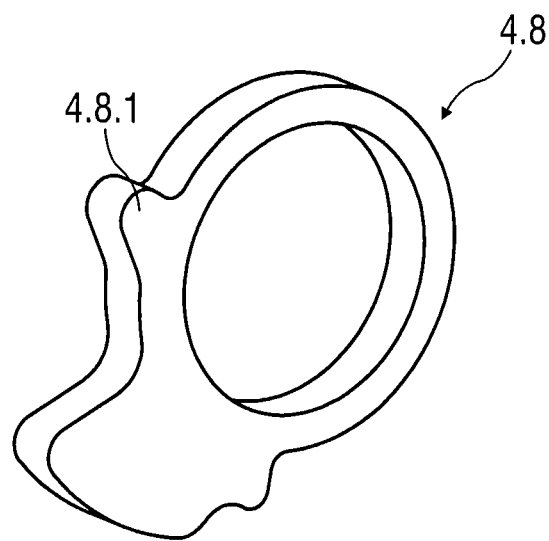
FIG. 13 is a schematic perspective view showing another of different exemplary embodiments of a deformation element.

FIG. 13 shows the stop element 4.8 with the drive element 4.8.1 for the backward movement.

Figure 14A:
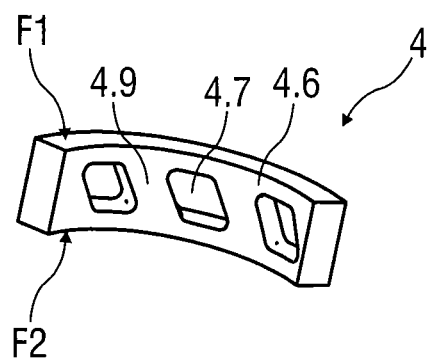
FIG. 14A is a schematic perspective view showing another of different exemplary embodiments of a deformation element.
Figure 14B:
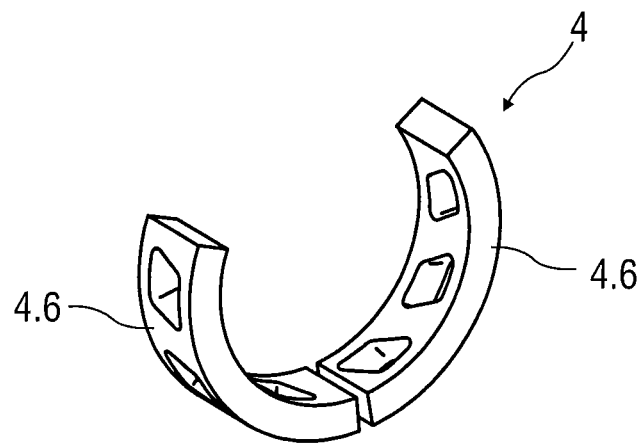
FIG. 14B is a schematic perspective view showing another of different exemplary embodiments of a deformation element.
Figure 14C:
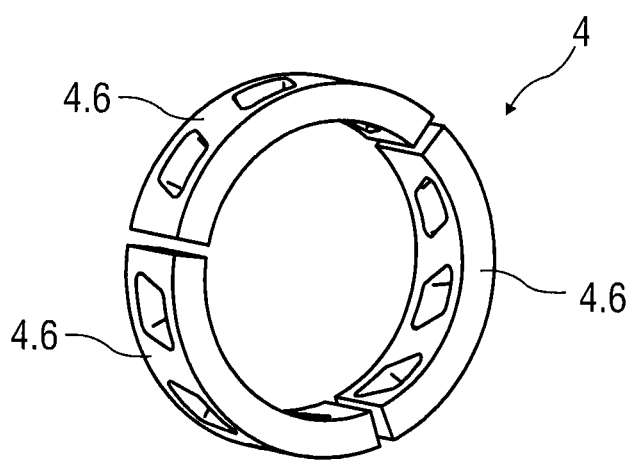
FIG. 14C is a schematic perspective view showing another of different exemplary embodiments of a deformation element.

FIGS. 14A to 14C show different embodiments of the deformation element 4 with a double-ring surface design with a circular segment (FIG. 14A), two circular segments forming a semi-circle (FIG. 14B) or three circular segments forming a circle (FIG. 14C).

Figure 15:
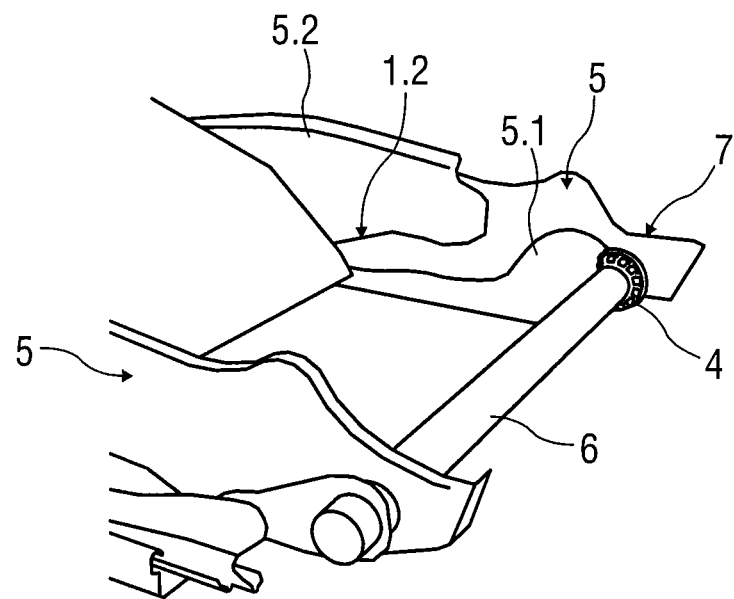
FIG. 15 is a schematic enlarged perspective view of a hinged area of a seating part with a further embodiment of a deformation element.
Figure 16A:
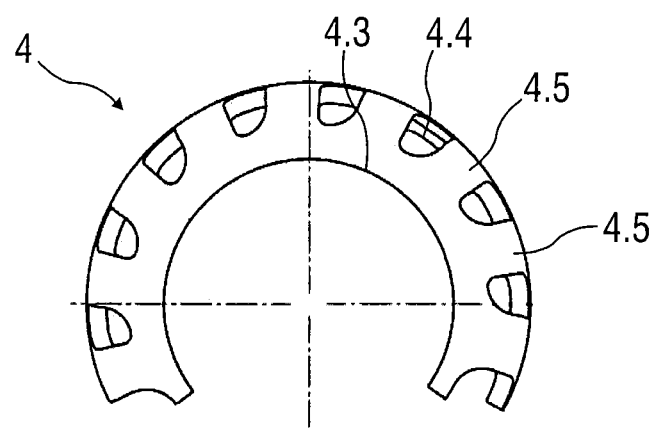
FIG. 16A is a schematic side view of the deformation element according to FIG. 15.
Figure 16B:
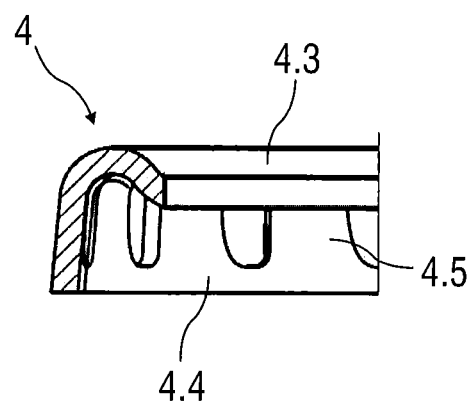
FIG. 16B is a schematic sectional view of the deformation element according to FIG. 15.
Figure 16C:
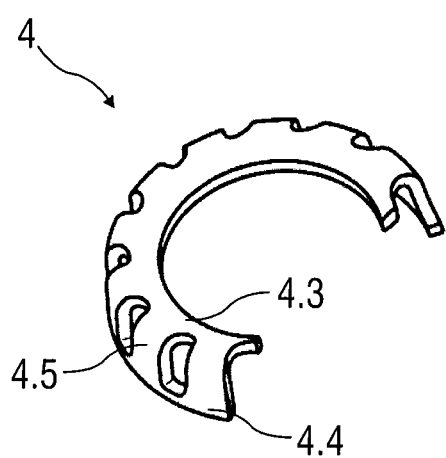
FIG. 16C is a schematic perspective view of the deformation element according to FIG. 15.

FIG. 15 shows schematic perspective view an enlarged view of the hinged area 7 of the lower seating part 1.2 with a further alternative embodiment of a deformation element 4. FIGS. 16A to 16C show schematically the deformation element 4 according to FIG. 15 in different views.

The deformation element 4 is configured in one piece. For example, the one-piece deformation element 4 is of pot-shaped configuration, wherein a circular segment is cut away from the pot base, so that the deformation element 4 is of annular configuration. In particular, the deformation element 4 is a pot-shaped component, which is shaped from sheet metal and which is configured at least partially as a circular segment. For example, the deformation element 4 is made from a steel, a so-called HSD steel (HSD=High Strength and Ductility), a so-called TWIP steel (TWIP=Twinning Induced Plasticity) or so-called TRIP steel (TRIP=Transformation Induced Plasticity).

In this case, the deformation element 4 has two rings 4.3, 4.4 spaced apart from one another. A first ring 4.3 is in this case arranged angled back relative to a second ring 4.4 according to the pot shape, wherein the deformation element 4 has a substantially J-shaped or L-shaped cross section.

The rings 4.3, 4.4 are connected together by means of webs 4.5. The webs 4.5 extend between the two rings 4.3, 4.4 such that these rings have an approximately parabolic transition to at least one of the rings 4.3, 4.4. As a result, a particularly good stress distribution is achieved when the deformation element 4 is subjected to load.

The ring 4.4, forming in cross section a long limb of the "J" or "L", is fastened to the pivoting arm 5.1 of the side part 5. The ring 4.3 forming a short limb is fastened to the transverse strut 6. In the event of an accident, the rings 4.3, 4.4 remain arranged in a stable and fixed manner on the side part 5 and/or the transverse strut 6. By a backward movement in the rotational direction R, as a result of the accident, the ring 4.3 rotates and as a result the webs 4.5 are deformed. By a corresponding design of the webs 4.5 and the rings 4.3, 4.4 a defined torque curve is predeterminable and adjustable in the event of the backward movement of the backrest part 1.1 in the rotational direction R. By a corresponding oblique position of the webs 4.5 and/or adaptation of the parabolic path a desired rotation and a deformation path may be achieved and set.

Due to a component design which leads to a combined material load consisting of tensile stress, bending stress and torsional stress, the exemplary embodiment shown makes use of a plastic deformability of the material used in a particularly clever way and thus constitutes a very efficient deformation element 4 exploiting the material used in an effective manner.

While specific embodiments of the invention have been shown and described in detail to illustrate the application of the principles of the invention, it will be understood that the invention may be embodied otherwise without departing from such principles.

What is claimed is:

1. A device for influencing a backward movement of a seat, in particular a backrest part of the seat, comprising
at least one deformation element arranged in a hinged area of a seating part of the seat,
wherein the deformation element is designed such that it is deformable due to a force acting on the seating part and/or the backrest part at a predefined torque;
wherein the deformation element comprises a first ring, a second ring and webs, the first ring and the second ring are connected to each other by the webs,
wherein the first ring is fastened to a transverse strut and the second ring is fastened to a first side part, and
wherein the first ring is arranged angled away from a cylinder defined by the second ring.

2. The device as claimed in claim 1, wherein the deformation element is configured as one-piece.

3. The device as claimed in claim 1, wherein the deformation element is of pot-shaped configuration, J-shaped or L-shaped configuration.

4. The device as claimed in claim 3, wherein the second ring is formed in cross section as a long limb and is fastened to the first side part.

5. The device as claimed in claim 3, wherein the first ring is formed in cross section as a short limb and is fastened to the transverse strut.

6. The device as claimed in claim 1, wherein the deformation element is made from sheet metal.

7. The device as claimed in claim 1, wherein the webs extend between the first ring and the second ring such that the first ring and the second ring each have an approximately parabolic transition portion connected to the other ring.

8. The device as claimed in claim 1, wherein the webs are deformable webs which deform as a result of a force acting on the seating part and/or the backrest part.

9. The device as claimed in claim 1, wherein in cross section the webs are formed J-shaped or L-shaped.

10. The device as claimed in claim 1, wherein the webs are arranged oblique relative to the rings.

11. The device as claimed in claim 1, wherein the first ring and the second ring are arranged angled about 90° relative to each other.

12. The device as claimed in claim 1, characterized in that
the seating part comprises two side parts and pivoting arms' and
between the pivoting arms' a transverse strut connecting said pivoting arms is arranged,
wherein at least on one side between one of the pivoting arms and one end of the transverse strut a deformation element is arranged in the hinged area of the seat.

13. A seat in particular a vehicle seat, comprising
a seating part,
a backrest part and
a device as claimed in claim 1.

* * * * *